US010900851B1

(12) United States Patent
Warsaw

(10) Patent No.: US 10,900,851 B1
(45) Date of Patent: Jan. 26, 2021

(54) DYNAMOMETER

(71) Applicant: Southern Dynamometer Company, LLC, Rincon, GA (US)

(72) Inventor: Aaron Warsaw, Rincon, GA (US)

(73) Assignee: Southern Dynamometer Company, LLC, Rincon, GA (US)

( * ) Notice: Subject to any disclaimer, the term of this patent is extended or adjusted under 35 U.S.C. 154(b) by 0 days.

(21) Appl. No.: 16/850,147

(22) Filed: Apr. 16, 2020

(51) Int. Cl.
*G01L 3/20* (2006.01)
*G01L 3/18* (2006.01)

(52) U.S. Cl.
CPC . *G01L 3/20* (2013.01); *G01L 3/18* (2013.01)

(58) Field of Classification Search
CPC .................................... G01L 3/20; G01L 3/18
See application file for complete search history.

(56) References Cited

U.S. PATENT DOCUMENTS 4,483,204 A * 11/1984 Warsaw ............... G01L 3/20
188/264 B
9,921,117 B2    3/2018 Warsaw

* cited by examiner

*Primary Examiner* — Paul M. West
(74) *Attorney, Agent, or Firm* — Davis, Brown, Koehn, Shors & Roberts, P.C.; Sean D. Solberg

(57) ABSTRACT

Disclosed herein are various dynamometer embodiments in which the devices have a cooling tank comprising cooling fluid, a rotatable drum body disposed over a stator body, and first and second friction disks axially extendable from the stator body such that the friction disks are frictionally engageable with the bases of the drum body. The bases of the drum body can be rotatable friction plates that are coupled via a connection tube to form the drum body.

20 Claims, 9 Drawing Sheets

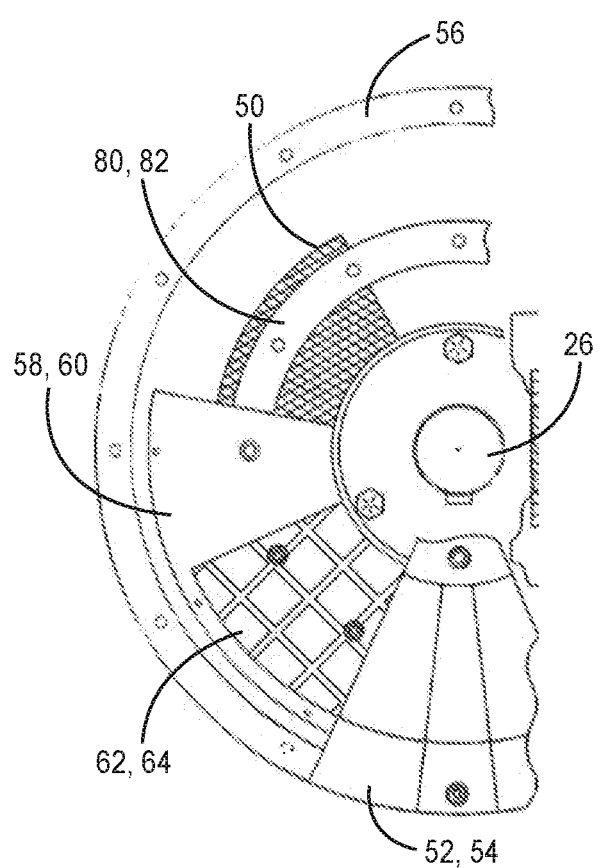 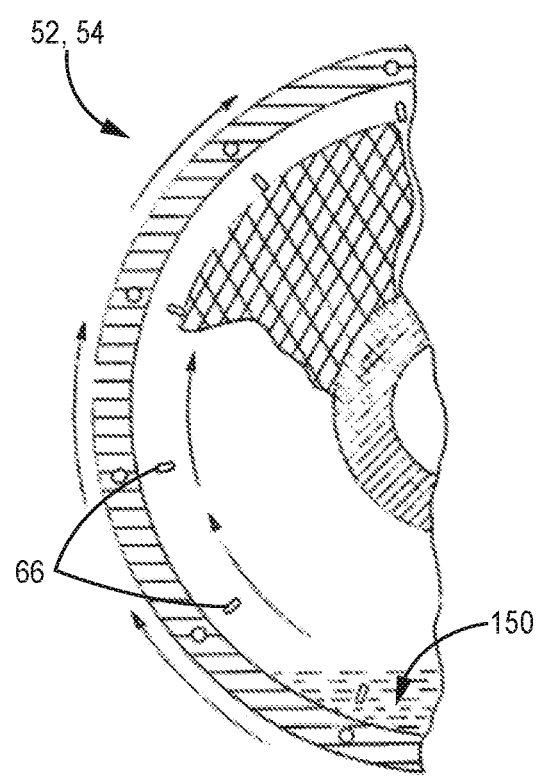
FIG. 10  FIG. 11

DYNAMOMETER

FIELD

The various embodiments herein relate to devices for measuring mechanical force and/or absorbing power of a prime mover, such as, for example, an internal combustion engine.

BACKGROUND

A dynamometer is a device for measuring mechanical force, or power, transmitted by a rotating shaft. Amongst the various types are "absorption dynamometers," which produce the torque they measure by creating a constant restraint to the turning of a shaft by mechanical friction, fluid friction, or electromagnetic induction.

A "Prony brake" is an absorption dynamometer that produces mechanical friction. It generally includes a rotating brake drum or disc connected with the output shaft of a prime mover, such as an internal combustion engine, and stationary friction pads, or brake shoes, that are engageable with the drum or disc in applying a retarding force thereto by frictional contact. The degree of retarding action is dictated by the force with which this frictional contact is applied. A Prony brake as described may be used in combination with torque measuring means as a dynamometer for testing the under-load performance characteristics of the prime mover. Alternatively, a Prony brake can also be used simply as a power absorption device (without torque measurement).

A Prony brake's reactionary force on a prime mover can be expressed or measured in units of weight, be it pounds or kilograms. Reactionary forces are transferred through the brake's internal stationary stator section's shafts. An external extension of the rotary shaft connects to a stationary moment arm or to a fixed torque arm. A torque arm has a defined distance from the centerline of its stationary pivot to a point where the reactionary force is to be measured. This distance can be in inches, feet or in terms of a metric unit. Final measurement of torque is expressed in pounds and feet, i.e., lb/ft, or metric equivalent. Again, a Prony brake only establishes the force or torque reaction to which that force can be measured.

Once a desired torque load has been obtained and torque values have been observed or recorded, it is at that point in time that the operational speed, or rpm (revolutions per minute), must also be observed. With a known torque load (lb/ft) and the operational speed (rpm), output power, or horsepower, can be calculated. Horsepower is the product of torque (lb/ft).times.rpm divided by a constant, i.e., 5252.

All inherent reactionary forces—both internal and external to the device—must be measured accurately. These forces can be created by several factors, including internal viscus oil shear, friction material drag, and external resistance to rotor travel through a cooling medium. Even though these forces may be small, they must be measured and accumulated in order to obtain maximum reaction force accuracy.

Most known Prony brakes include a brake drum. Brake drums are formed by pouring molten cast iron into a prefabricated sand casting mold. There are several disadvantages with brake drums. For example, wooden patterns or aluminum match plates required to make the mold are expensive and require maintenance from time to time. Further, this type of casting process results in impurities and imperfections being suspended in the casting. Other disadvantages include sand holes, gas holes, and hard spots within the casting. Such impurities and imperfections at the point of friction can reduce friction material operating lifetime, as well as the life of the brake drum. Brake drums must also be free of porosities which could allow water to penetrate the internal chamber of the brake. Water, oil and friction brakes do not mix very well. Should the brake experience water infiltration, it will go through rapid changes in its coefficient of friction, causing the unit to severely vibrate.

Yet another disadvantage is that servicing and repair of Prony brakes is typically invasive and time-consuming. The performance of periodic, routine servicing of a typical Prony brake can easily extend over several hours, with each brake requiring individual, independent servicing.

A further disadvantage of most known Prony brakes is the internal stationary stator, which has radially extendable friction pads that create mechanical friction by extending radially until the pads contact the inner surface of the circumferential wall of the brake drum. Such a radially extending stator typically requires a complex design with multiple pistons and/or brake assemblies. In addition, the interaction of the radially extending piston brake and the rotating brake drum can result in a rocking action between the stator body and the piston brake, which can damage the Prony brake.

There is a need in the art for an improved dynamometer.

BRIEF SUMMARY

Discussed herein are various prony brake and dynamometer devices for measuring mechanical force and/or absorbing power of a prime mover.

In Example 1, a dynamometer comprises a cooling tank comprising cooling fluid, a drum body rotatably disposed in the cooling tank, and a stator body disposed within the drum body and attached to the stator shaft. The drum body comprises a first rotatable friction plate rotatably disposed around a stator shaft, a second rotatable friction plate rotatably disposed around the stator shaft, and a connection tube attached to the first and second rotatable friction plates. The stator body comprises a first friction disk disposed around the stator shaft and adjacent to the first rotatable friction plate, wherein the first friction disk is axially moveable between a retracted position and an extended position, and a second friction disk disposed around the stator shaft and adjacent to the second rotatable friction plate, wherein the second friction disk is axially moveable between a retracted position and an extended position.

Example 2 relates to the dynamometer according to Example 1, wherein the stator body further comprises a first actuation ring disposed within a first channel defined within the stator body, the first actuation ring operably coupled to the first friction disk, and a second actuation ring disposed within a second channel defined within the stator body, the second actuation ring operably coupled to the second friction disk.

Example 3 relates to the dynamometer according to Example 2, wherein the stator body further comprises a hydraulic pressure conduit defined within the stator body, wherein the hydraulic pressure conduit is in fluidic communication with the first channel and the second channel.

Example 4 relates to the dynamometer according to Example 3, wherein the first and second actuation rings are hydraulically actuable by hydraulic fluid disposed within the hydraulic pressure conduit.

Example 5 relates to the dynamometer according to Example 4, wherein increased pressure of the hydraulic fluid is configured to urge the first and second actuable rings outward, thereby urging the first and second friction disks into the extended positions.

Example 6 relates to the dynamometer according to Example 1, wherein the first friction disk in the extended position is in frictional contact with the first friction plate and the second friction disk in the extended position is in frictional contact with the second friction plate.

Example 7 relates to the dynamometer according to Example 1, further comprising a first support disk attached to the first actuation ring, wherein the first friction disk is attached to the first support disk, and a second support disk attached to the second actuation ring, wherein the second friction disk is attached to the second support disk.

Example 8 relates to the dynamometer according to Example 7, further comprising at least two tension springs, wherein each of the at least two tension springs is attached at a first end to the first support disk and at a second end to the second support disk, wherein each of the at least two tension springs is configured to urge the first and second friction disks toward the retracted positions.

Example 9 relates to the dynamometer according to Example 1, wherein the first rotatable friction plate comprises a first inner friction surface comprising first transfer cavities defined within the first inner friction surface, and wherein the second rotatable friction plate comprises a second inner friction surface comprising second transfer cavities defined within the second inner friction surface, wherein the first and second transfer cavities are configured to cause flow of lubrication fluid within the drum body during rotation of the drum body.

Example 10 relates to the dynamometer according to Example 1, wherein the first rotatable friction plate comprises first pockets defined in an outer surface of the first rotatable friction plate and the second rotatable friction plate comprises second pockets defined in an outer surface of the second rotatable friction plate, wherein the first and second pockets are configured to cause flow of cooling fluid within the cooling tank during rotation of the drum body.

In Example 11, a dynamometer comprises a cooling tank comprising cooling fluid and a rotatable cylindrical drum body disposed in the cooling tank, the cylindrical drum body comprising first and second bases rotatably disposed around a stator shaft, the first base comprising a first inner friction surface and the second base comprising a second inner friction surface and a circumferential body disposed between and attached to the first and second bases, wherein the first and second bases and the circumferential body define an interior of the cylindrical drum body. The dynamometer further comprises a stator body disposed within the interior of the drum body, the stator body comprising a first axially actuable actuation ring disposed within a first channel defined within the stator body, a first friction disk operably coupled to the first axially actuable actuation ring and moveably disposed between the stator body and the first rotatable friction plate, a second axially actuable actuation ring disposed within a second channel defined within the stator body, a second friction disk operably coupled to the second axially actuable actuation ring and moveably disposed between the stator body and the second rotatable friction plate, and a hydraulic pressure conduit defined within the stator body, wherein the hydraulic pressure conduit is in fluidic communication with the first and second channels.

Example 12 relates to the dynamometer according to Example 11, wherein the first and second actuation rings are hydraulically actuable by hydraulic fluid disposed within the hydraulic pressure conduit, wherein increased pressure of the hydraulic fluid is configured to urge the first and second actuable rings outward, thereby urging the first and second friction disks into frictional contact with the first and second inner friction surfaces, respectively.

Example 13 relates to the dynamometer according to Example 11, wherein the stator body further comprises at least two first ring pins attached to the stator body and disposed in the first channel, and at least two second ring pins attached to the stator body and disposed in the second channel.

Example 14 relates to the dynamometer according to Example 13, wherein the first actuation ring comprises at least two first ring pin openings defined within the first actuation ring, wherein the at least two first ring pins are slidably disposed within the at least two first ring pin openings such that the first actuation ring is axially movable in relation to the at least two first ring pins and rotationally constrained to the stator body, and the second actuation ring comprises at least two second ring pin openings defined within the second actuation ring, wherein the at least two second ring pins are slidably disposed within the at least two second ring pin openings such that the second actuation ring is axially movable in relation to the at least two second ring pins and rotationally constrained to the stator body.

In Example 15, a dynamometer comprises a cooling tank comprising a first reservoir, a second reservoir in fluidic communication with the first reservoir, and cooling fluid disposed within the first and second reservoirs. Further, the dynamometer also comprises a fixed stator shaft disposed within the first reservoir and comprising a longitudinal axis and a stator body fixedly attached to the fixed stator shaft. The stator body comprises a first friction disk moveably disposed on a first side of the stator body, and a second friction disk moveably disposed on a second side of the stator body, wherein the first and second friction disks are actuable in opposing directions between a retracted position and an extended position along paths parallel to the longitudinal axis of the stator shaft. In addition, the dynamometer also comprises a rotatable drum body rotatably disposed around the stator shaft and the stator body, the drum body comprising a first plate disposed adjacent to the first friction disk, the first plate comprising a first inner friction surface, a second plate disposed adjacent to the second friction disk, the second plate comprising a second inner friction surface, and a circumferential body coupled to the first plate and the second plate, wherein the first plate, second plate, and circumferential body define a fluidically sealed drum interior.

Example 16 relates to the dynamometer according to Example 15, wherein the first plate comprises first transfer cavities defined in the first inner friction surface and the second plate comprises second transfer cavities defined in the second inner friction surface, wherein the first and second transfer cavities are configured to cause flow of lubrication fluid within the drum interior during rotation of the drum body.

Example 17 relates to the dynamometer according to Example 15, wherein the first plate comprises first pockets defined in an outer surface of the first plate and the second plate comprises second pockets defined in an outer surface of the second plate, wherein the first and second pockets are configured to cause flow of cooling fluid within the first and second reservoirs during rotation of the drum body.

Example 18 relates to the dynamometer according to Example 15, wherein the stator body further comprises a hydraulic pressure conduit defined within the stator body, wherein the hydraulic pressure conduit is operably coupled to the first and second friction disks such that increased hydraulic pressure in the hydraulic pressure conduit urges the first and second friction disks toward the extended positions.

Example 19 relates to the dynamometer according to Example 18, wherein the stator body further comprises a first actuation ring disposed within a first channel defined within the stator body, the first actuation ring operably coupled to the first friction disk, and a second actuation ring disposed within a second channel defined within the stator body, the second actuation ring operably coupled to the second friction disk, wherein the first and second channels are in fluidic communication with the hydraulic pressure conduit.

Example 20 relates to the dynamometer according to Example 18, wherein the first friction disk in the extended position is in frictional contact with the first inner friction surface and the second friction disk in the extended position is in frictional contact with the second inner friction surface.

While multiple embodiments are disclosed, still other embodiments will become apparent to those skilled in the art from the following detailed description, which shows and describes illustrative embodiments. As will be realized, the various implementations are capable of modifications in various obvious aspects, all without departing from the spirit and scope thereof. Accordingly, the drawings and detailed description are to be regarded as illustrative in nature and not restrictive.

BRIEF DESCRIPTION OF THE DRAWINGS

FIG. 10 is a cutaway front/rear view of certain components of the rotatable drum body of FIG. 4, according to one embodiment.

FIG. 11 is a cutaway front/rear view of certain components of the rotatable drum body of FIG. 4, according to one embodiment.

DETAILED DESCRIPTION

The various dynamometer device embodiments disclosed or contemplated herein have a rotating brake drum, a stationary stator body disposed therein, and opposing axially-extending friction pads moveable coupled to the stator body such that a first friction pad is contactable with a first base of the drum and the second friction pad is contactable with a second base of the drum.

Figure 1A:
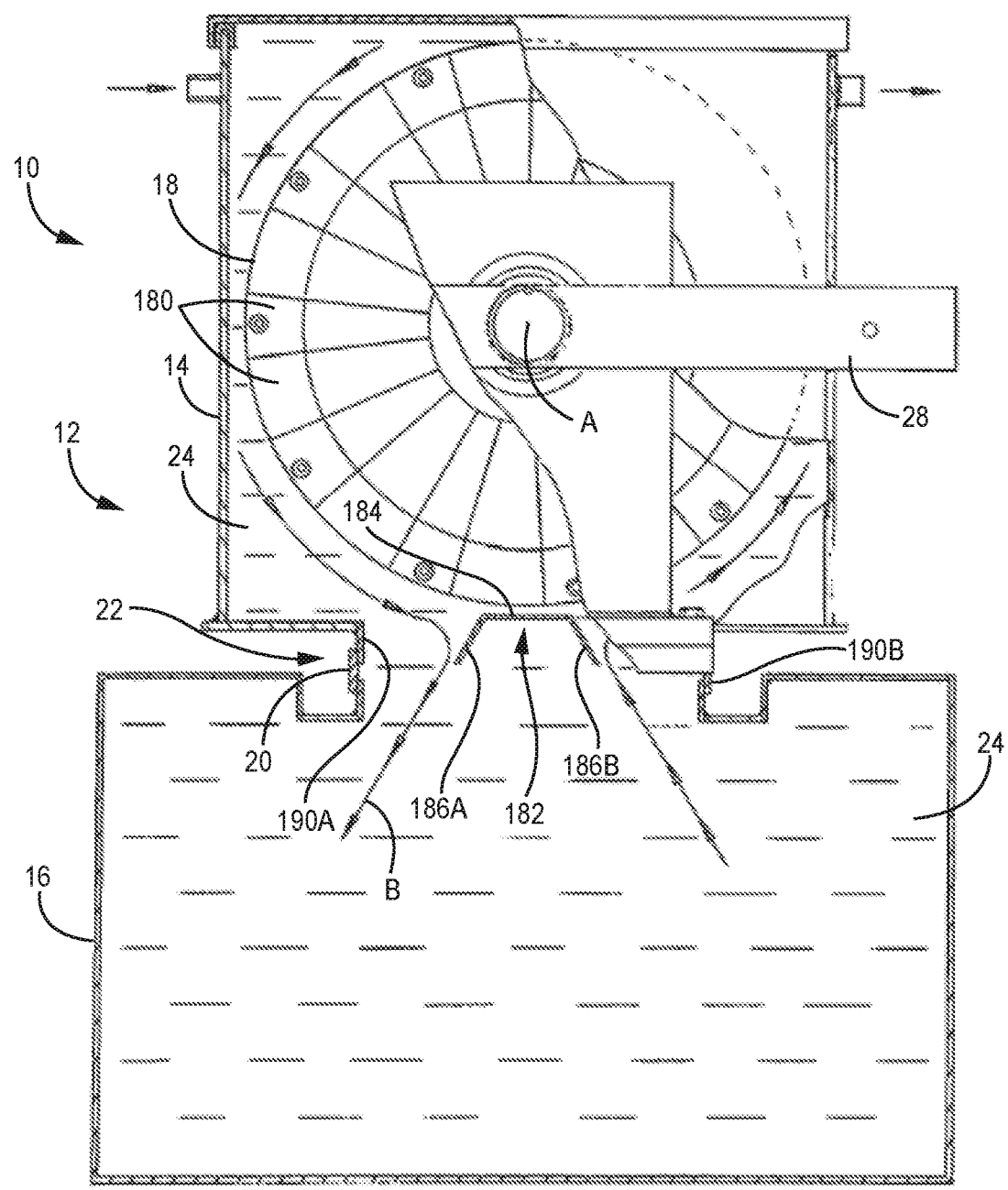
FIG. 1A is a rear cross-sectional view of a dynamometer device, according to one embodiment.
Figure 1B:
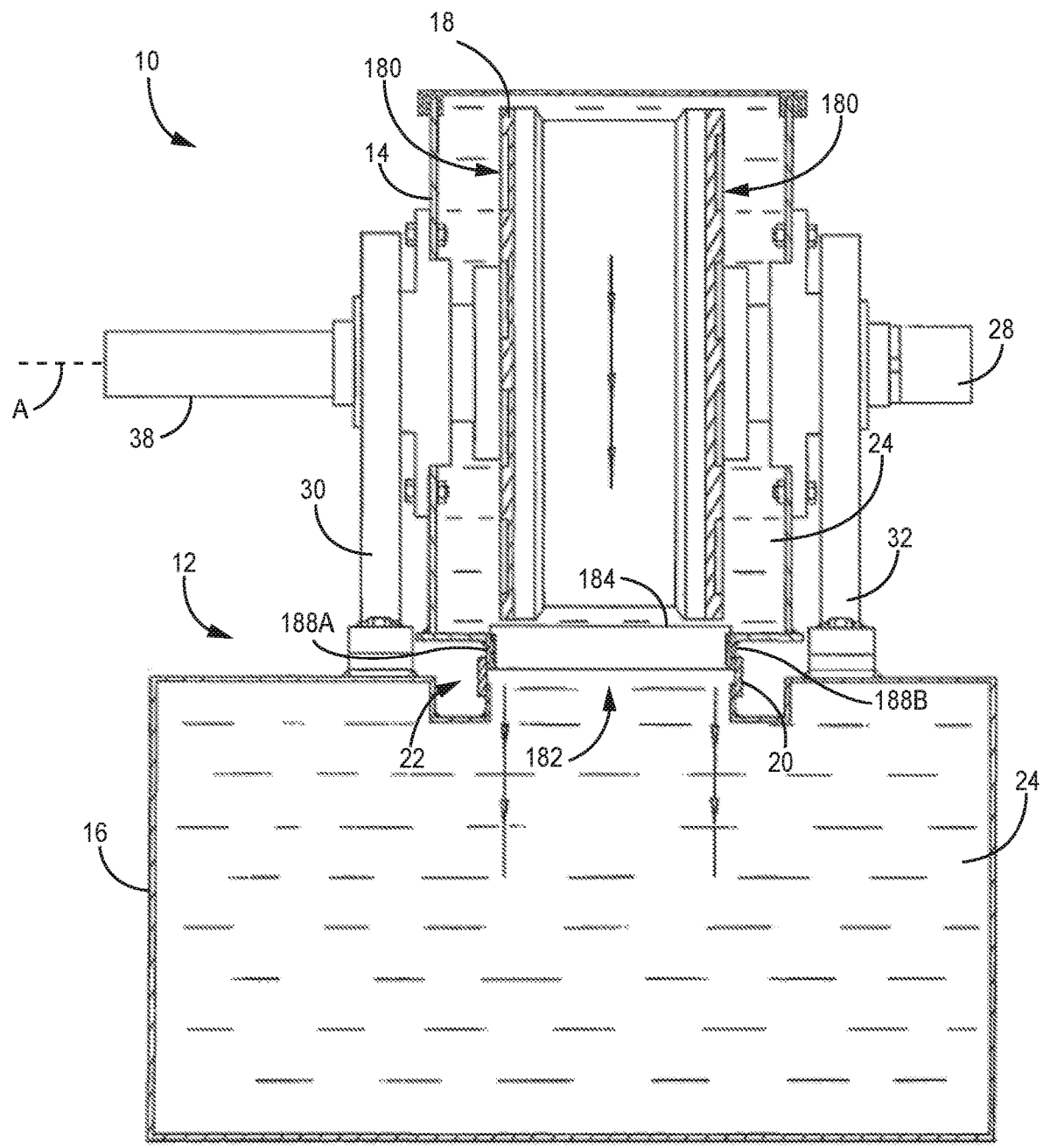
FIG. 1B is a side cross-sectional view of the dynamometer device of FIG. 1A, according to one embodiment.

FIGS. 1A and 1B depict a dynamometer device 10 according to one embodiment, with FIG. 1A depicting a rear view of the device 10 and FIG. 1B depicting a side view. The device 10 has a tank 12 that is made up of two reservoirs: a first (or primary) cooling reservoir 14 and a second (or secondary) cooling reservoir 16. Further, the device 10 has a rotatable drum body 18 disposed within the first reservoir 14. The two reservoirs 14, 16 are coupled via a flexible coupling collar 20 that couples the two reservoirs 14, 16 at a neck 22 such that the two reservoirs 14, 16 are in fluidic communication via the neck 22. The two reservoirs 14, 16 contain cooling fluid 24 that flows between the two reservoirs 14, 16 as described in additional detail below.

Figure 2:
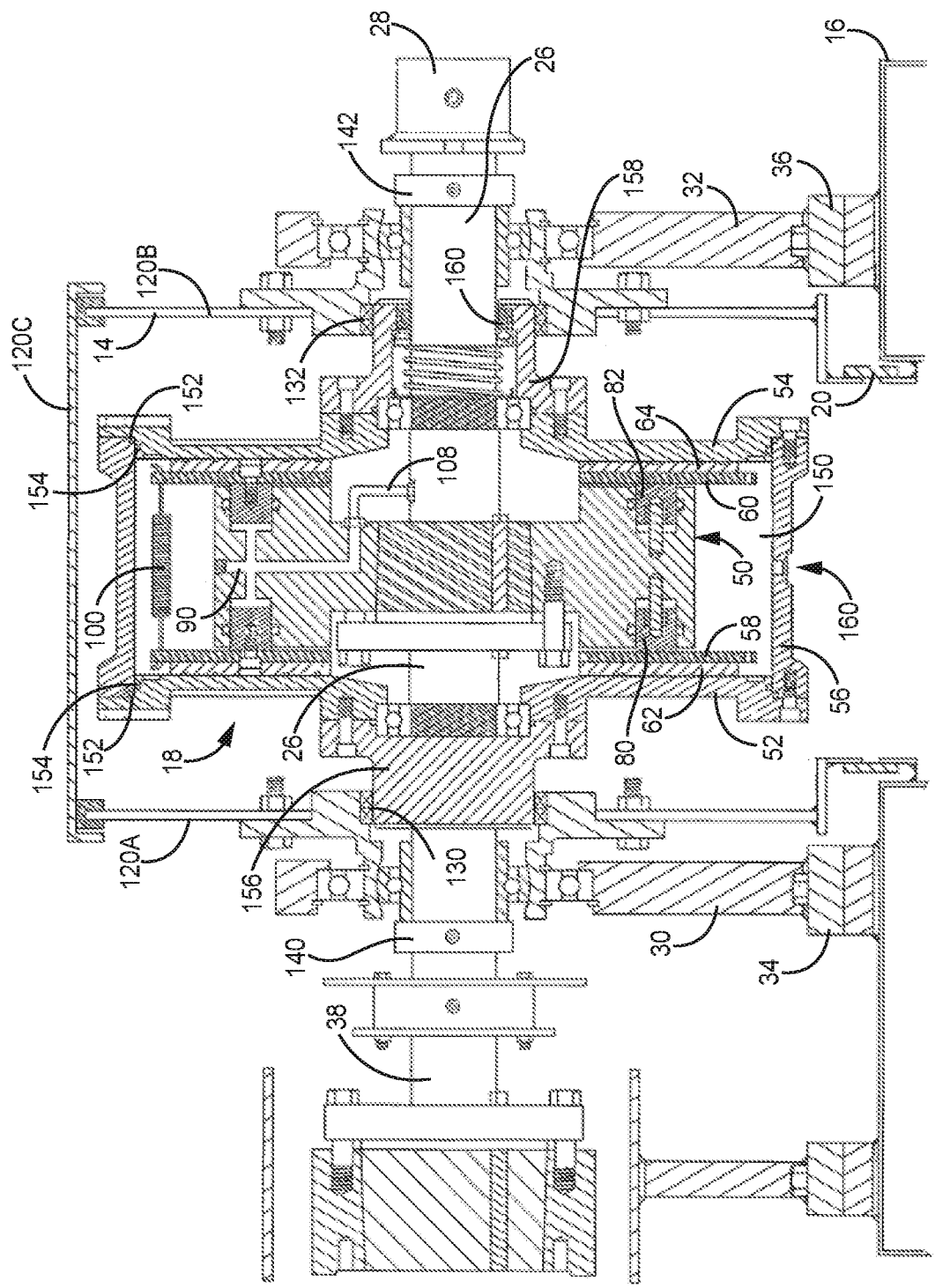
FIG. 2 is a side cross-sectional view of a primary cooling reservoir of a dynamometer device, according to one embodiment.

As best shown in FIG. 1B, the device 10 has a stator shaft 26 that extends into the first reservoir 14 such that the rotatable drum body 18 rotates around the shaft 26. As such, the drum body 18 rotates around longitudinal axis A, which is concentric with the longitudinal axis of the stator shaft 26. As best shown in FIG. 2, disposed on the front or first side of the reservoir 14 and disposed concentrically with (along the same longitudinal axis as) the stator shaft 26 is an input shaft 38, which is rotationally coupled to a prime mover (not shown), such as, for example, an internal combustion engine. That is, the input shaft 38 is the component of the dynamometer device 10 that is coupleable to the prime mover that is to be tested. Further, the input shaft 38 is rotationally constrained to the drum body 18 via the drum seal housing 156 (as will be discussed in further detail below) such that rotation of the input shaft 38 causes rotation of the drum body 18. The input shaft 38 will be discussed in additional detail below. As best shown in FIG. 1A, the device 10 also has a torque arm 28, which is the component of the device 10 that measures the torque output of the prime mover, as will be discussed in additional detail below. The rotatable drum body 18 is rotatably supported by the first (or front) and second (or rear) bearing columns 30, 32, as best shown in FIG. 1B. As discussed in detail below and depicted in FIGS. 2 and 3, the bearing columns 30, 32 contain shaft bearings 126, 128 that rotatably receive the shafts 38, 26. More specifically, the bearing column 30 contains shaft bearing 126, which rotatably receives the rotatable input shaft 38 that is rotationally coupled to the drum body 18, as will be discussed in further detail below. Similarly, the bearing column 32 contains shaft bearing 128, which rotatably receives the substantially stationary stator shaft 26. In this context, it is understood that the term "rotatably receive" means that the shaft bearings 126, 128 are substantially stationary such that the shafts 38, 26 can rotate in relation to the bearings 126, 128. In this specific embodiment, the columns 30, 32 are coupled to the top surface of the second reservoir 16 via bases 34, 36 as shown. Alternatively, it is understood that the shaft bearings 126, 128 can be supported by any known vertical support structures that can be coupled to the top surface of the second reservoir 16 in any known fashion via any known mechanism or component.

Figure 4:
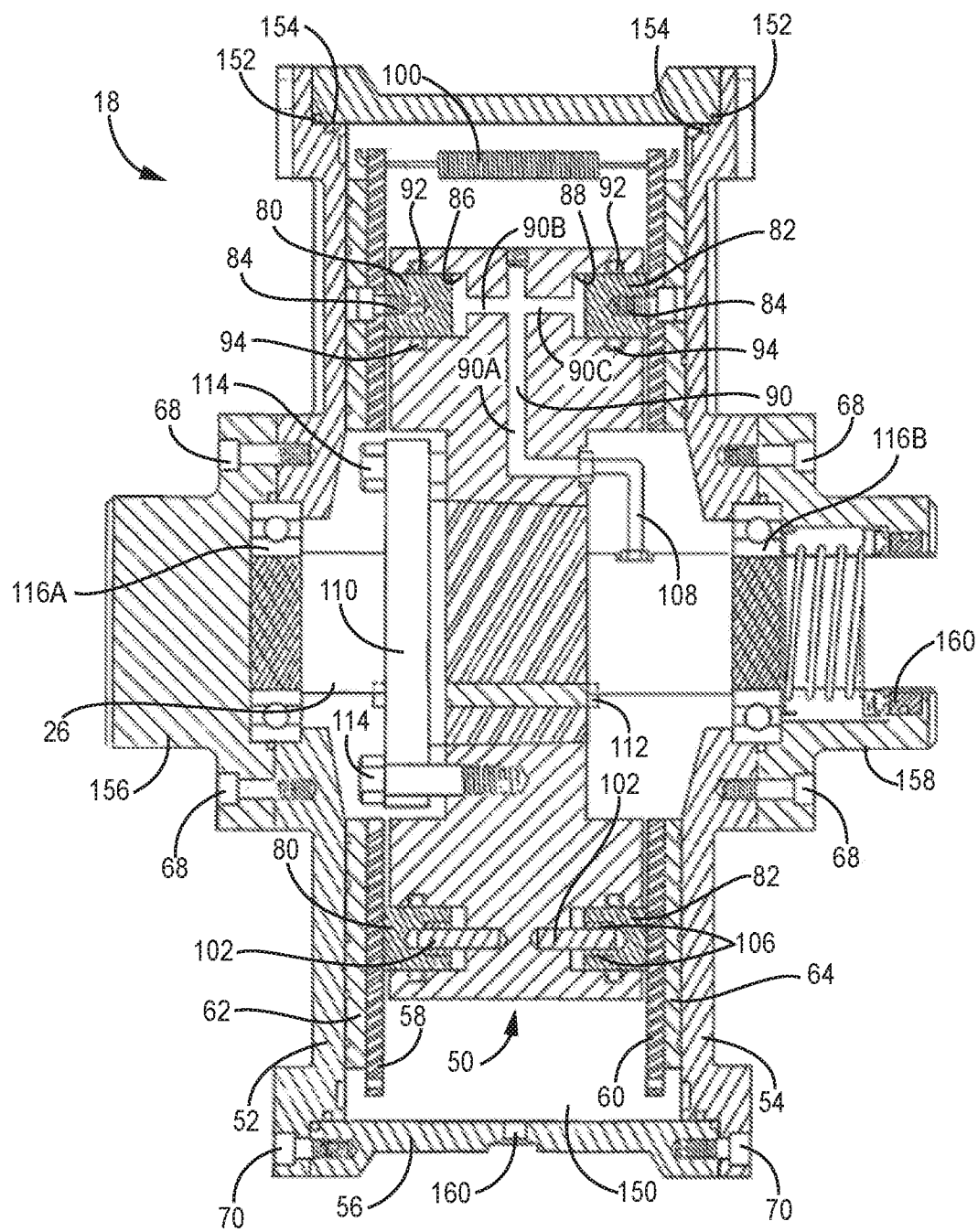
FIG. 4 is a side cross-sectional view of a rotatable drum body, according to one embodiment.

As best shown in FIGS. 2 and 4, which provides a cross-sectional view of the internal components, the device 10 has a stator body 50 stationary disposed within the rotatable drum body 18 such that the drum body 18 rotates around the stator body 50. The drum body 18 has two circular bases or friction plates: a first (or front) base (or "friction plate") 52 and a second (or rear) base (or "friction plate") 54. The two bases 52, 54 are coupled to each other via a circumferential body (or "tube") 56. More specifically, in one embodiment, the two bases 52, 54 are coupled to the tube 56 via screws 70 as shown in FIG. 4. Alternatively, any known coupling mechanisms or component can be used to couple the bases 52, 54 and the tube 56. Further, the body 18 has two drum seal housings 156, 158: a first (or "front") seal housing 156 attached to the first friction plate 52 and a second (or "rear") seal housing 158 attached to the second friction plate 54. In the specific exemplary implementation depicted, the housings 156, 158 are attached to the friction plates 52, 54 via attachment screws 68 as best shown in FIG. 4. Alternatively, any known coupling or attachment mechanisms or components can be used to couple the housings 156, 158 to the plates 52, 54. For reasons explained in detail below, in certain implementations, the tube 56 is capable of withstanding significant internal expansion forces created by the internal components discuss below.

The rotatable drum body 18 is coupled to the input shaft 38 such that rotation of the body 18 is caused by the input shaft 38. More specifically, the input shaft 38 is rotationally constrained to the front seal housing 156 of the body 18 as best shown in FIG. 2. In embodiment, the housing 156 is fixedly attached to the shaft 38. Alternatively, the housing 156 is integral with the shaft 38 such that the two components 156, 38 are a single component. Given that the housing 156 is fixedly attached to the first friction plate 52, which is fixedly attached to the tube 56 and the second friction plate 54, rotation of the input shaft 38 causes rotation of the rotatable body 18 via the front seal housing 156. In other words, rotation of the input shaft 38 causes rotation of the drum 18.

Figure 6:
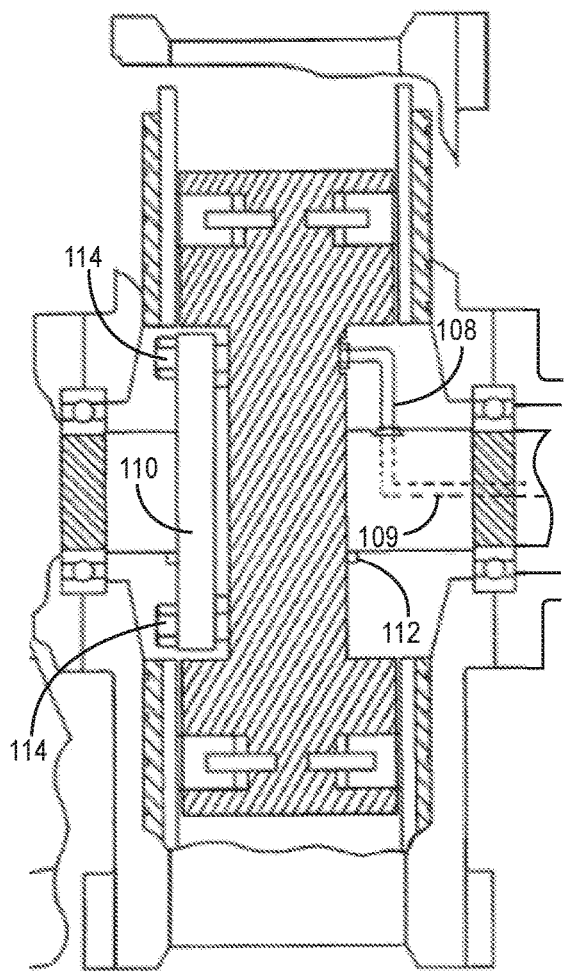
FIG. 6 is a side cross-section view of certain components of the rotatable drum body of FIG. 4, according to one embodiment.
Figure 7:
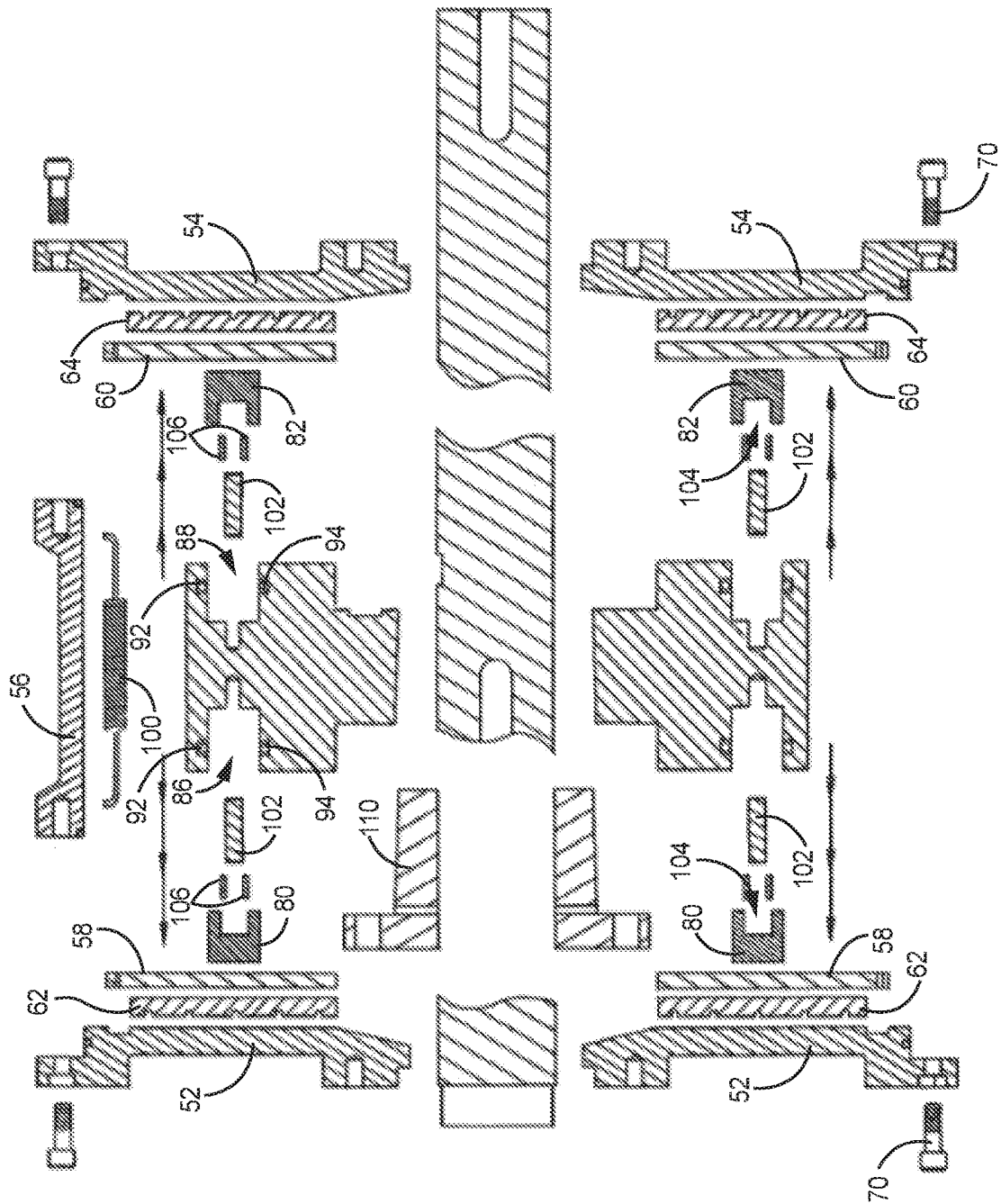
FIG. 7 is an exploded view of certain components of the rotatable drum body of FIG. 4, according to one embodiment.
Figure 8:
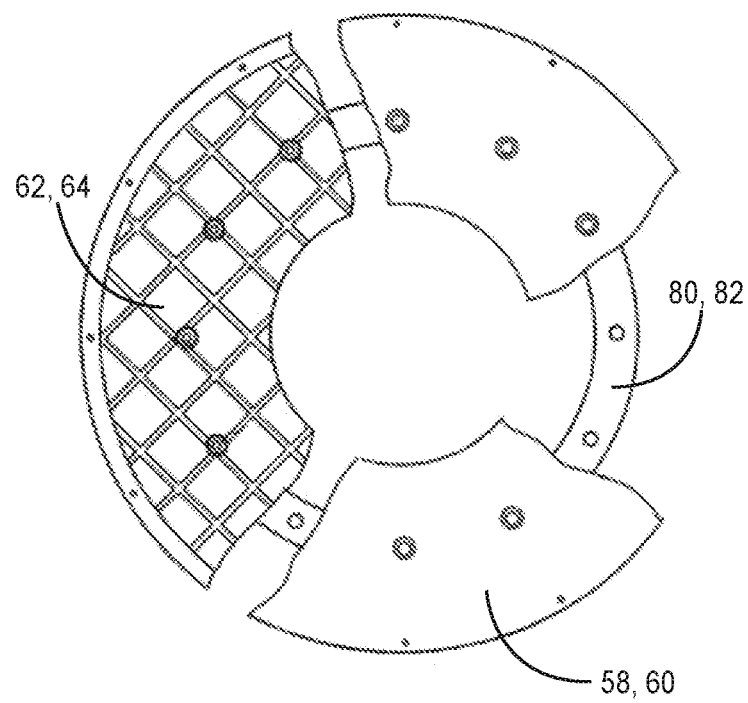
FIG. 8 is a front/rear view of certain components of the rotatable drum body of FIG. 4, according to one embodiment.
Figure 9:
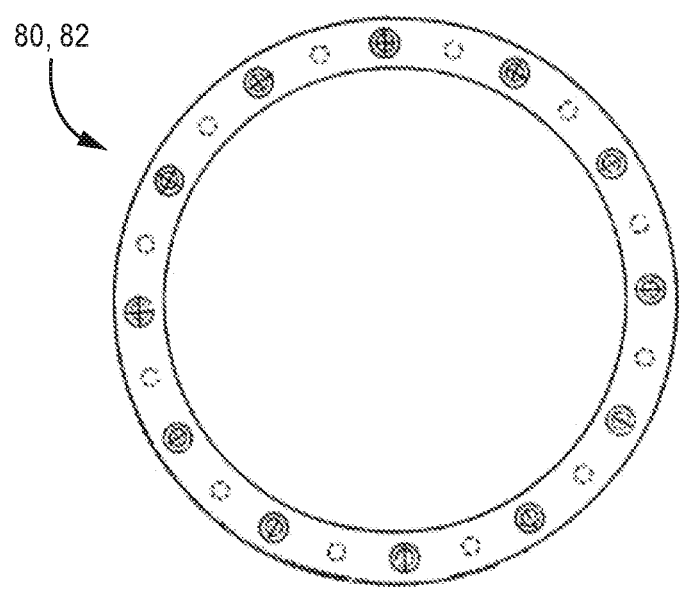
FIG. 9 is a front/rear view of an actuation ring for the rotatable drum body of FIG. 4, according to one embodiment.

Returning to the stationary stator body 50 around which the drum body 18 rotates, the stator body 50 is fixedly attached the stator shaft 26 discussed above. As best shown in FIGS. 4, 6, and 7, the stator body 50 is fixedly attached to the stator shaft 26 via the tapered bushing 110 and key 112. More specifically, the bushing 110 is disposed around and attached to the shaft 26 and is coupled to the stator body 50 via the screws 114. Alternatively, the body 50 is coupled to the shaft 26 via any known attachment methods or mechanisms. In a further alternative, the shaft 26 is integral with the body 50. As discussed above, the stator shaft 26 extends out of the rotating drum body 18 and the first reservoir 14.

As best shown in FIG. 4, both the rotatable drum body 18 and the stationary stator assembly (the combination of the stator body 50 and the stator shaft 26) share the first and second bearings (also referred to as "pilot bearings") 116A, 116B. More specifically, the first and second bearings 116A, 116B are disposed around the stator shaft 26. Further, the drum body 18 is rotatably disposed around and is supported by the first and second bearings 116A, 116B such that the drum body 18 rotates in relation to the bearings 116A, 116B and the stator shaft 26. In one implementation, each of the first and second bearings 116A, 116B has an inner race and an outer race that is rotational in relation to the inner race. In this specific embodiment, the inner race being in contact with the stator shaft 26 such that the inner race is stationary, while the outer race is in contact with the drum body 18 such that the outer race is rotatable along with the drum body 18. Alternatively, any known bearing of any known configuration can be used for the first and second bearings 116A, 116B.

As best shown in FIGS. 2, 4, 7, 8, and 10, the stator body 50 has axially extendable plates—first and second pressure disks (also referred to as "intermediate disks" or "support disks") 58, 60 and first and second friction disks 62, 64—that are urged outward (axially) into contact with the friction plates 52, 54 of the rotatable drum 18. The first friction disk 62 is coupled to the first pressure disk 58 such that the stator body 50 can urge the two disks 58, 62 toward the first friction plate 52 of the drum body 18, thereby resulting in the first friction disk 58 contacting the first friction plate 52. Similarly, second friction disk 64 is coupled to the second pressure disk 60 such that the stator body 50 urges the two disks 60, 64 toward the second friction plate 54 of the drum body 18, thereby resulting in the second friction disk 64 contacting the second friction plate 54. The operation of the stator body 50 to urge the friction disks 62, 64 into contact with the friction plates 52, 54 of the rotatable drum body 18 will be explained in additional detail below. It is understood that the contact of the friction disks 62, 64 with the friction plates 52, 54 creates friction between the disks 62, 64 and the plates 52, 54, thereby slowing the rotation of the rotatable drum 18 or requiring additional power to be used to rotate the drum 18 in order to maintain the same rotational speed. The greater the force used to urge the friction disks 62, 64 into contact with the plates 52, 54, the greater the friction and thus the greater the force required to continue to rotate the drum 18.

In one embodiment, the friction plates 52, 54 of the drum body 18 (as best shown in FIGS. 4, 7, 10, and 11) are any disk-shaped or disk-like precision manufactured and symmetrical components 52, 54 that form the bases 52, 54 of the cylindrical drum body 18. In certain implementations, the plates 52, 54 are made of high quality continuous cast pearlitic gray iron bar stock containing flake graphite. Alternatively, the plates 52, 54 can be made of an material having sufficiently high machinability, strength, hardness and frictional surface wear resistance. It is understood that the inner surface of each of the friction plates 52, 54—which will contact the friction disks 58, 62—has a surface finish that can withstand the friction caused by the contact of each such plate 52, 54 with the appropriate disk 58, 62. Further, as best shown in FIG. 11, in certain implementations, each of the friction plates 52, 54 can have two or more transfer cavities (also referred to as "transfer vanes") 66 defined or otherwise incorporated into the interior face of the plate 52, 54 (the surface that contacts the opposing friction disk 62, 64). The transfer vanes 66 can be, in certain embodiments, strategically located to allow the lubrication fluid 150 (as best shown in FIGS. 2, 4, and 11) disposed within the drum 18 (which will be discussed in more detail below) to be more evenly distributed around the periphery of the friction disks 62, 64. More specifically, the vanes 66 in the rotating plates 52, 54 cause the lubrication fluid 150 to be distributed more evenly as a result of the flow of fluid created by the vanes 66.

As best shown in FIGS. 2, 4, 5, 7, 8, 9, and 10, the axially extendable disks—first and second pressure disks 58, 60 and first and second friction disks 62, 64—are urged axially by actuation rings 80, 82 that are moveably disposed within the stator body 50 and are attached to the first and second pressure disks 58, 60. More specifically, as best shown in FIG. 4, the first actuation ring 80 is attached to the first pressure disk 58 via a screw 84 and the second actuation ring 82 is attached to the second pressure disk 60 via a similar screw 84. Alternatively, the rings 80, 82 can be coupled to the pressure disks 58, 60 via any known attachment mechanism or component. Each of the rings 80, 82 is disposed in a channel 86, 88 in the stator body 50 (as best shown in FIGS. 4 and 7) such that the rings 80, 82 can move axially. More specifically, the first ring 80 is moveably disposed within the first channel 86, and the second ring 82 is moveably disposed within the second channel 88. As best shown in FIGS. 2 and 4, each channel 86, 88 is in fluidic communication with the stator body hydraulic pressure conduit 90 defined within the stator body 50 such that the hydraulic pressure applied via the body conduit 90 can be used to urge the rings 80, 82 axially as will be discussed in further detail below. In one embodiment, each of the two channels 86, 88 has two seals 92, 94 disposed therein, as best shown in FIGS. 4 and 7. The seals 92, 94 are disposed within the channels 86, 88 in order to maintain a fluidic seal between the actuation rings 80, 82 and the walls of the channels 86, 88, thereby retaining the hydraulic fluid within the body conduit 90 and on the stator body side of the channels 86, 88. In one embodiment, the seals 92, 94 are known O-ring seals 92, 94. Alternatively, the seals 92, 94 are any know fluidic seals for maintaining a fluidic separation as described.

When hydraulic pressure is not applied in the stator body conduit 90 to urge the rings 80, 82, the pressure disks 58, 60, and the friction disks 62, 64 outwardly (away from the stator body 50), the rings 80, 82 and disks 58, 60, 62, 64 are urged inwardly (toward the stator body 50) by the springs 100 tensionably attached to the pressure disks 58, 60, as best shown in FIGS. 2, 4, and 7. While only one spring 100 is visible in FIGS. 2 and 4, it is understood that, according to certain embodiments, there are at least two such springs 100 attached to the two opposing pressure disks 58, 60. In fact, according to some implementations, there are as many as twelve or more springs 100 attached to the disks 58, 60. The springs 100 are in an untensioned state when the pressure disks 58, 60 are in the retracted position. Thus, when the actuation rings 80, 82 are actuated by hydraulic pressure via the body conduit 90 to move outwardly, thereby urging the pressure and friction disks 58, 60, 62, 64 outwardly, the springs 100 are urged into a tensioned state such that when the hydraulic pressure is removed, the springs 100 urge the pressure disks 58, 60—and hence the friction disks 62, 64 and actuation rings 80, 82—back to the retracted position.

In one embodiment, the actuation rings 80, 82 are precision-manufactured steel rings 80, 82. Further, in certain implementations, the rings 80, 82 have a precision finish on both the inner diameter surface and the outer diameter surface to allow for establishing fluidic sealing via the precision finish. Alternatively, the rings 80, 82 can be made of any material that can be used in such actuation components as contemplated herein.

Figure 5:
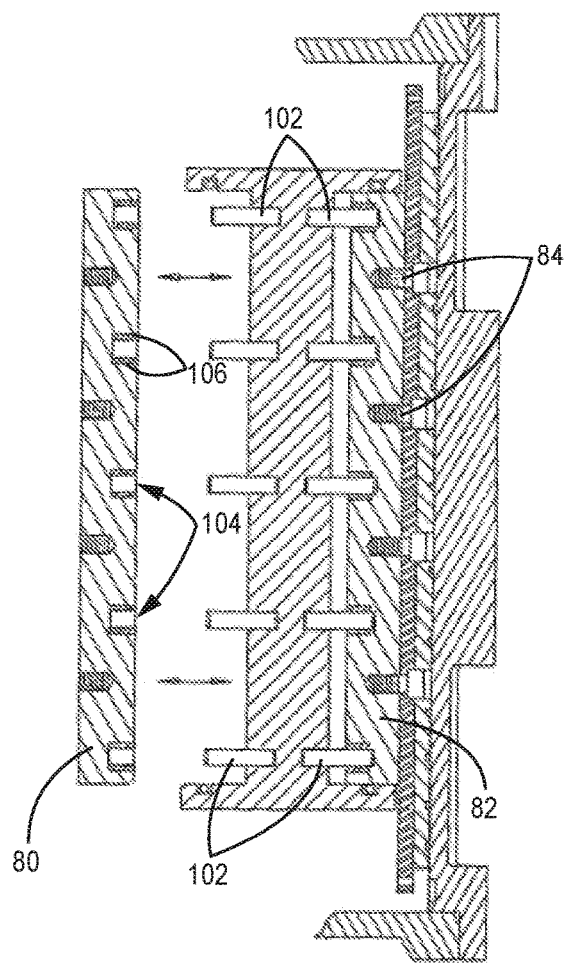
FIG. 5 is a side cross-sectional view of certain components of the rotatable drum body of FIG. 4 according to one embodiment.

As best shown in FIGS. 4, 5, and 7, in certain embodiments, the actuation rings 80, 82 are rotationally constrained with respect to the stator body 50 via pins 102 that are fixedly attached to the body 50 and slidably attached to the actuation rings 80, 82. More specifically, as best shown in FIGS. 5 and 7, each ring 80, 82 has openings 104 defined in the side of the rings 80, 82 facing the stator body 50, each of which is sized to slidably receive one of the pins 102 such that the rings 80, 82 can move axially in relation to the pins 102 but cannot rotate in relation to the body 50. In certain implementations, such as the exemplary implementation shown in these figures, the openings 104 contain bushings 106 configured to receive the pins 102 (as best shown in FIGS. 4, 5, and 7). Thus, while the rings 80, 82 are fixedly attached to the pressure disks 58, 60, which are fixedly attached to the friction disks 62, 64, and while all of the rings 80, 82 and the disks 58, 60, 62, 64 are moveable axially, the rotational constraint created by the pins 102 prevents the frictional contact between the friction disks 62, 64 and the rotating friction plates 52, 54 from causing rotation of the friction disks 62, 64, the pressure disks 58, 60, or the rings 80, 82. Instead, the force created by the friction between the friction disks 62, 64 and the friction plates 52, 54 is transferred to the stator body 50 as a result of the pins 102.

The hydraulic pressure system of the stator body 50, according to one embodiment, will now be described in additional detail. The stator body hydraulic pressure conduit 90 as best shown in FIGS. 2 and 4 allows for hydraulic pressure to be applied to the actuation rings 80, 82 as described above via hydraulic fluid. It is understood that any known hydraulic fluid can be used. As best shown in FIG. 4, in certain implementations, the conduit 90 has a single radial shaft 90A and two axial shafts 90B, 90C, with the axial shafts 90B, 90C in fluidic communication with the actuation ring channels 86, 88, respectively. That is, the axial shaft 90B is in fluidic communication with the radial shaft 90A and extends toward and is in fluidic communication with the first ring channel 86, and the axial shaft 90C is in fluidic communication with the radial shaft 90A and extends toward and is in fluidic communication with the second ring channel 88. As a result of this configuration in which both axial shafts 90B, 90C are in fluidic communication with the single radial shaft 90A, the amount of pressure applied to the actuation rings 80, 82 is relatively equally applied to each ring 80, 82 and along each of the axial shafts 90B, 90C. More specifically, as the friction disks 62, 64 contact the friction plates 52, 54, the pressure applied by the hydraulic fluid in the conduit 90 becomes balanced as the hydraulic fluid is distributed along the axial shafts 90B, 90C in a relatively equal fashion. In other words, the hydraulic pressure is equalized and balanced between the actuation rings 80, 82, thereby producing smooth and balanced engagement of the friction disks 62, 64 with the friction plates 52, 54.

As best shown in FIG. 6, the body conduit 90 are coupled to and in fluidic communication with an external conduit 108 that couples to and is in fluidic communication with a stator shaft conduit 109. In one embodiment, the external conduit 108 is a high pressure conduit 108. The stator shaft conduit 109 is coupled to and in fluidic communication with an external hydraulic pressure source (not shown). It is understood that the external source can be any known hydraulic pressure source and is further understood that the external source provides regulated control of the amount of hydraulic pressure applied (by controlling the amount of hydraulic fluid and the amount of pressure applied) and thus the amount of force applied by the actuation rings 80, 82. The external source (not shown) provides the hydraulic fluid that creates the hydraulic pressure. When the actuation rings 80, 82 are to be actuated to move outwardly, the fluid is transported along the stator shaft conduit 109 through the external conduit 108, and through the stator body conduit 90 such that the hydraulic fluid enters the ring channels 86, 88 and applies hydraulic pressure to the actuation rings 80, 82, thereby urging the rings 80, 82 outwardly to result in frictional engagement of the friction disks 62, 64 with the friction plates 52, 54. If/when more resistance is required, the external source can be actuated to increase the hydraulic pressure until the desired load or torque value is achieved.

As mentioned above, the engagement of friction discs 62, 64 and the friction plates 52, 54 produces the equal and opposite reactive force required for torque measurement. During frictional engagement between the rotatable friction plates 52, 54 and the stationary friction disks 62, 64, all reactive forces are transferred through the secured connections between the pressure disks 58, 60 and the actuation rings 80, 82. Forces created through this process are then transferred from the actuation rings 80, 82 to the pins 102 discussed above, which are attached to the stator body 30. The accumulated force or torque is then transferred through the stator body 50 to the attached stator shaft 26, and thus the force/torque is transferred to the torque arm 28 attached to the shaft 26. The torque arm 28 is the final point of transfer for the force transferred during the braking process and is used for measurement.

The transfer of the force created by the friction between the disks 62, 64 and the plates 52, 54 to the stator body 50 and thus to the torque arm 28 as discussed above can be measured via any known measurement method or device. For example, the device 10 can provide for electronic measurement of these forces via known electronic measurement methods or electronic measurement devices such as a voltage-scaled strain gauges or pressure transducers. Alternatively, any known analog measurement devices or methods can be used, including, for example, hydraulic cylinders, hydraulic diaphragms calibrated to mechanical pressure gauges, etc. In addition, according to certain embodiments, the attachment of the torque arm 28 to the external measurement mechanism (not shown) is the stabilizing force that keeps the attached stator shaft 26 and the attached stator body 50 attached.

Figure 3:
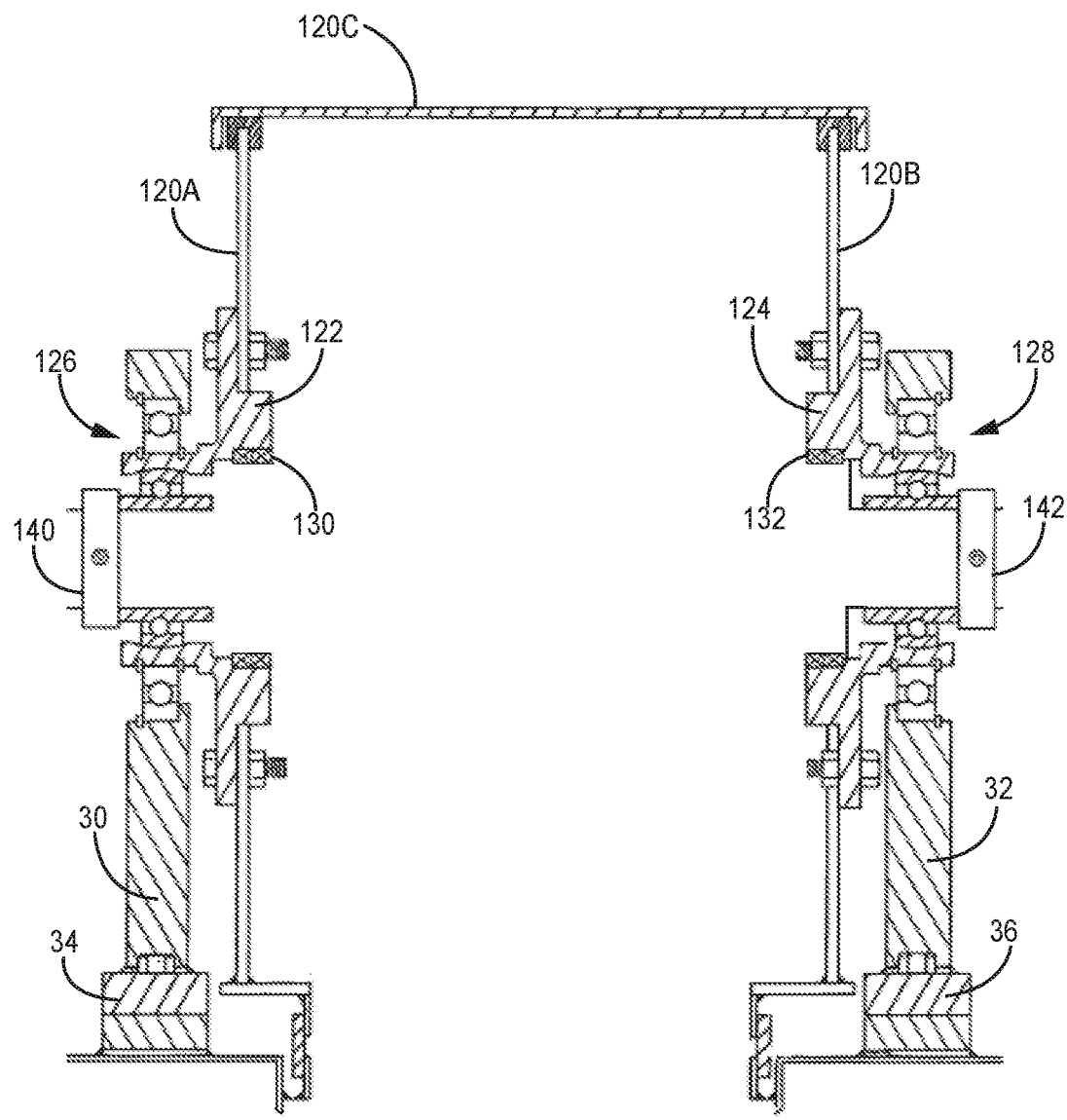
FIG. 3 is a side cross-sectional view of the primary cooling reservoir of FIG. 2 with certain components removed, according to one embodiment.

Turning now to a more detailed discussion of the tank 12, as best shown in FIGS. 2 and 3, the primary reservoir 14 has side walls 120A, 120B and a top wall (also referred to as a "cover") 120C that create the first reservoir 14. Further, the reservoir 14 has a first (or front) bearing housing 122 and a second (or rear) bearing housing 124, wherein each of the housings 122, 124 are attached to and form a portion of each of the side walls 120A, 120B as shown. Further, the bearing housings 122, 124 receive the stator shaft 26, which is disposed through each of the housings 122, 124. In addition, the housings 122, 124 are coupled to the shaft bearings 126, 128, respectively, as shown. More specifically, the first housing 122 is coupled to first (or front) shaft bearing 126 and the second housing 124 is coupled to the second (or rear) shaft bearing 128. The first and second housings 122, 124 and the coupled first and second bearings 126, 128 support the rotatable drum body 18 and the shafts 38, 26 (both the rotatable input shaft 38 and the stationary stator shaft 26). More specifically, the first bearing housing 122 has a first fluidic seal 130 that supports the front portion of the rotatable drum body 18 and the second bearing housing 124 has a second fluidic seal 132 that supports the rear portion of the rotatable drum body 18 such that the rotatable drum body 18 can rotate in relation to the seals 130, 132. The first and second seals 130, 132 establish a fluidic seal that retains the cooling fluid 24 within the tank 12 while allowing for the rotation of the body 18 around the stator shaft 26. In one exemplary embodiment, the first and second fluidic seals 130, 132 are known high pressure stainless steel viton water seals 130, 132. Alternatively, any known high pressure fluidic seals can be used.

In addition, the first bearing housing 122 also has an input shaft bearing 140 that is attached to the housing 122 and receives the input shaft 38 such that the input shaft 38 is rotatably disposed through the input shaft bearing 140. Similarly, the second bearing housing 124 has a torque arm bearing 142 that is attached to the housing 124 and receives the stator shaft 26 such that the shaft 26 is rotatably disposed through the bearing 142. While the stator body 30 and hence the shaft 26 are substantially stationary in relation to the rotatable drum body 18 as described above, it is understood that the stator shaft 26 does rotate a relatively minimal amount as also described above as a result of the torque created by the prime mover (not shown) and transferred to the stator body 30 via the frictional interaction of the friction plates 52, 54 with the friction disks 62, 64. Thus, the torque arm bearing 142 allows the rotation of the stator shaft 26 therein, thereby allowing for rotation of the torque arm 28.

As mentioned above, and as best shown in FIGS. 1B, 2, and 3, the two reservoirs 14, 16 provide support to the rotatable drum 18 and the stator body 30. More specifically, as mentioned above, the bearing columns 30, 32 are disposed on the second reservoir 16 and provide support to the shaft bearings 126, 128 (and thereby provide support to the bearing housings 122, 124 as well). More specifically, the shaft bearings 126, 128 are disposed on the columns 30, 32, with the first shaft bearing 126 disposed on the first column 30 and the second shaft bearing 128 disposed on the second column 32.

In addition to structural support, the two bearing columns 30, 32 also make it possible to measure both the internal and external forces being created by the operation of the device 10 and incorporate such forces into the final calculation of the torque value. More specifically, the configuration of the two columns 30, 32 providing support to the drum body 18, the stator body 50, and the front and rear side walls 120A, 120B as described above results in the tank 14 being free to move (or oscillate) as a result of any extraneous forces applied to the tank 14 during operation of the device 10, which allows for measurement of those forces. Some of the extraneous forces may be relatively small but must be recorded to insure the accuracy of the force measurement, especially when the device 10 is being used as a dynamometer 10. Extraneous forces are produced by the mechanical nature of the device 10, and more specifically can be created by, for example, the structural design, lubrication fluid drag, friction disk drag, cooling fluid circulation, cooling fluid pumping loss, and any other known factors. The extraneous forces can also be created by other similar factors and are inevitably generated during both static and dynamic operation of the device 10.

Returning to a closer examination of the rotatable drum 18 and stator body 50, according to one implementation, each of the friction disks 62, 64 are made of known composites such as, for example, a conventional non-asbestos, phenolic treated, brass wire inserted, fiber glass cloth laminated composite. Alternatively, the disks 62, 64 can be made of any known material that can withstand the friction to which the disks 62, 64 are exposed. The external face of each disk 62, 64 (the surface that contacts the opposing friction plate 52, 54), in accordance with certain embodiments, has a groove pattern formed thereon, thereby allowing for penetration and free flow of lubrication fluid 150 contained in the rotatable drum 18 (which will be discussed in further detail below) through the material of the disk 62, 64.

Each friction disk 62, 64 is attached to its respective pressure disk 58, 60 by any known mechanical method or device or known chemical bonding method. In addition, the friction disks 62, 64 are also supported or retained in place by the attachment screws 84. More specifically, the heads of the attachment screws 84 (which attach the pressure disks 58, 60 to the actuation rings 80, 82 as discussed above) are disposed within openings in the friction disks 62, 64 such that the screw heads 84 rotationally constrain the friction disks 62, 64 to the pressure disks 58, 60. This rotational constraint helps to retain the friction disks 62, 64 in place while the disks 62, 64 are in frictional contact with the friction plates 52, 54. In addition, in certain embodiments, the screws 84 can also provide additional structural support to the friction disks 62, 64 by also resist wear as a result of the frictional contact with the friction plates 52, 54.

As best shown in FIGS. 2 and 4, the coupling of the friction plates 52, 54 and the connector tube 56 creates a fluidically sealed environment within the rotatable drum body 18 such that lubrication fluid 150 disposed within the body 18 is retained therein and the cooling fluid 24 contained within the tank 12 is prevented from entering the body 18. In certain embodiments (including the exemplary embodiment as shown), there are two fluidic seals 152, 154 provided between the plates 52, 54 and the tube 56 to enhance the fluidic seal of the body 18. In one specific implementation, the seals 152, 154 are O rings 152, 154. Alternatively, any known seals can be used. In addition, each of the drum seal housings 156, 158 on the drum body 18 also have seals 160 (the first drum seal housing seal is not shown) that help to maintain the fluidic seal that retains the lubrication fluid within the body 18. In one embodiment, each of the first and second drum housing seals 160 (the first drum housing seal is not shown) are known high pressure, self-adjusting, face type seals housed in the drum seal housings 156, 158. Alternatively, any known seals can be used.

An appropriate volume of the lubricating fluid 150 disposed within and allowed to flow throughout the interior of the rotatable drum body 18 (assisted by the transfer vanes 66 in the friction plates 52, 54 as discussed above) maintains a balanced coefficient of friction with respect to the moving components therein, thereby helping to maintain the performance of the device 10. Thus, any loss of the lubricating fluid 150 would cause an unbalanced coefficient of friction, which would subject the contacting surfaces of the friction plates 52, 54 and the friction disks 62, 64 to damage or premature failure. Further, penetration of the cooling fluid 24 from the tank 12 into the interior of the drum body 18 would also cause significant damage, including, for example, producing rapid and extreme changes in the coefficient of friction, which could create a skipping action that would cause violent vibrations, especially during low speed, high torque applications. In addition, the fluidic sealing of the rotating drum body 18 also reduces the risk of penetration of oxygen, dirt, dust or any other known foreign material into the interior of the drum body 18.

The interior of the drum body 18 and the stator body 50 can be purged to further reduce the risk of oxygen or other undesirable materials being present therein. In one embodiment, the interior can be purged with nitrogen to create a pure, inert environment within the interior of the drum body 18 and stator body 18.

In accordance with certain embodiments, the level of lubrication fluid 150 in the interior of the drum body 18 can be checked via the inspection port 160 as best shown in FIGS. 2 and 4. More specifically, the inspection port 160 can be used to monitor both the quantity and quality of the lubrication fluid 150.

In use, the various device 10 embodiments disclosed or contemplated herein can be coupled to an output shaft of a prime mover—such as a power takeoff on a agricultural tractor, for example—to operate as a power absorption device and/or a dynamometer to measure the torque of the prime mover by generating mechanical friction. More specifically, the input shaft 38 is coupled to the output shaft (not shown) of the prime mover (not shown) such that rotation of the output shaft by the prime mover (not shown) causes rotation of the input shaft 38, which causes rotation of the drum body 18, as described above. At this point, the external hydraulic fluid source (not shown) can be actuated as discussed above to urge hydraulic fluid into and through the conduit 90 and into contact with the actuation rings 80, 82 such that the rings 80, 82 urge the pressure disks 58, 60 and friction disks 62, 64 outwardly such that the friction disks 62, 64 make frictional contact with the friction plates 52, 54, thereby applying frictional resistance. And as also discussed above, the external source can be adjusted to adjust the pressure and thus the amount of frictional resistance as desired.

The ongoing cooling of the lubrication fluid 150 during use is beneficial. According to certain embodiments, one advantage of the instant rotatable drum body 18 configuration is the resulting cooling action of the connection tube 56. More specifically, the connection tube 56 is in rotating contact with the cooling fluid 24 such that the cooling action of the cooling fluid 24 with respect to the rotating connection tube 56 results in the inner surface of the connection tube 56 causing cooling of the lubrication fluid 150 within the drum body 18. This cooling action is enhanced by the fact that the connection tube 56 is not in frictional contact with the friction disks 62, 64 or any other portion of the stationary stator body 50, thereby not being exposed to the heat generated by such contact.

Turning now to the exterior surface features of the friction plates 52, 54, according to one embodiment, the external surfaces (the surfaces facing away from the stator body 50) of the plates 52, 54 can have fluid transfer pockets 180 defined therein, as best shown in FIGS. 1A and 1B. During rotation of the drum body 18, the fluid transfer pockets 180 can act to create flow of cooling fluid 24 within the tank 12. More specifically, the rotation of the drum body 18 causes the body 18 to act in a fashion similar to a water pump as a result of the fluid transfer pockets 180, which cause the cooling fluid 24 to flow along a path adjacent to the rotating plates 52, 54 and in the same direction as the rotation. In one embodiment, each plate 52, 54 has at least two pockets 180 defined therein. Alternatively, each plate 52, 54 has a plurality of pockets 180. The rotation of the drum body 18 and resulting increased flow of the cooling fluid 24 increases the volume of the fluid 24 traveling across the external surfaces of the plates 52, 54, which increases the amount of internal heat (generated by the frictional contact with the friction disks 62, 64) removed from the plates 52, 54.

Further, the increased flow of fluid 24 also results in an increased circulation and mixing of fluid 24 throughout the entire tank 12 (compared to flow of fluid 24 without the pockets 180), thereby resulting in an increased introduction of cooler cooling fluid 24 from the second reservoir 16 into the first reservoir 14 through the neck 22 and hence into contact or proximity with the plates 52, 54, thereby further enhancing the cooling effect. Further, the flow of the cooling fluid 24 between the first and second reservoirs 14, 16 occurs at a rate that is proportional to the rotation speed of the drum 18. Given that the frictional heat generated in the drum 18 also increases as the rotational speed of the drum 18 increases, this increased flow rate of the cooling fluid 24 counteracts the increased heat. In fact, in some embodiments, the increased rotation results in a cooling fluid 24 volume sufficient to absorb the greater heat levels generated at speeds greater than 800 rpm through 2500 rpm. Thus, the increased volume of fluid 24 contacting the plates 52, 54 and the increased introduction of "fresh" fluid 24 from the second reservoir 16 results in increased transfer of heat from the plates 52, 54 without having to provide an external mechanism or power to create the increased circulation, because the rotating drum body 18 provides the increased circulation itself. More specifically, the prime mover being test that provides the power for the cooling fluid circulation as described herein. The resulting self-contained cooling system created by the combination of the cooling fluid 24 and the pockets 180 allows for longer and more complete device 10 test session times (because of the greater heat transfer from the drum body 18). This advantage becomes more important when the dynamometer is being operated in an environment with limited or inadequate water supply sources.

In one embodiment, the circulation of cooling fluid 24 can also be enhanced/improved by a diverter structure 182 positioned in the tank 12 as best shown in FIGS. 1A and 1B. More specifically, in certain implementations, the diverter structure 182 is positioned substantially within or at least near the neck 22 between the first and second reservoirs 14, 16. In one embodiment, the diverter structure 182 is an elongate structure (also referred to herein as a "channel") having an elongate body 184 and two wings 186A, 186B extending at an angle from the body 184 as shown. Alternatively, any structure that can divert the flow of the cooling fluid 24 as desired can be incorporated into this device 10. Further, as best shown in FIG. 1B, the diverter channel 182 attached at a first end of the channel 182 to a first (or front) end 188A of the neck 22 and extends across the neck 22 and is attached at a second end of the channel 182 to a second (or back) end 188B of the neck 22. In addition, as best shown in FIG. 1A, the channel 182 is disposed within the neck 22 such that there is space defined between a first side 190A of the neck 22 and the first wing 186A of the channel 182 and further there is space defined between a second side 190B of the neck 22 and the second wing 186B. Thus, cooling fluid 24 can flow through those two spaces defined between the wings 186A, 186B and the sides of the neck 22 as shown.

In operation, the diverter channel 182 directs the flow of the coolant fluid 24 as it travels between the first reservoir 14 and the second reservoir 16 through the neck 22. More specifically, the diverter channel 182 is disposed below and in relatively close proximity with the drum body 18 such that the channel 182 is disposed within the normal rotational flow of the fluid 24 flowing around the drum body 18. That is, without the diverter channel 182 present, the fluid 24 would flow in a rotational fashion around the rotating body 18 and thus most of the fluid 24 in close proximity to the rotating body 18 would not flow into the second reservoir 16. Thus, the diverter channel 182 is disposed and shaped such that the first wing 186A diverts the flow of fluid 24 from the first reservoir 14 as represented by arrow B into the second reservoir 16 as shown. As a result, the diverter channel 182 creates a more complete mix of the coolant fluid 24 temperatures throughout the tank 12. Similarly, the second wing 186B is disposed to divert the flow of fluid 24 from the second reservoir 16 into the first reservoir 14 as represented by arrow C.

In this exemplary embodiment, due to the shape (with two wings 186A, 186B that are mirrors of each other) and position of the diverter channel 182, the rotation of the drum body 18 in either direction will produce the same coolant 24 flow and overall circulation of the cooling fluid 24. As a result, there are no disruptive procedures or additional steps required when operating the device 10 in one direction or the other. In fact, in certain implementations, the internal and external symmetry of the components of the device 10 not only reduces quantity requirements for production and replacement, but also results in bi-directional operation of the device 10, while providing the same cooling fluid transfer, operational features and torque capacity in either direction of rotation.

According to one implementation, the torque capacity of any specific device 10 can be modified to fulfill specific applications or requirements by simply increasing or decreasing the diameter of the friction plates 52, 54.

Although the various embodiments have been described with reference to preferred implementations, persons skilled in the art will recognize that changes may be made in form and detail without departing from the spirit and scope thereof.

What is claimed is:

1. A dynamometer comprising:
   (a) a cooling tank comprising cooling fluid;
   (b) a drum body rotatably disposed in the cooling tank, the drum body comprising:
      (i) a first rotatable friction plate rotatably disposed around a stator shaft;
      (ii) a second rotatable friction plate rotatably disposed around the stator shaft; and
      (iii) a connection tube attached to the first and second rotatable friction plates; and
   (c) a stator body disposed within the drum body and attached to the stator shaft, the stator body comprising:
      (i) a first friction disk disposed around the stator shaft and adjacent to the first rotatable friction plate, wherein the first friction disk is axially moveable between a retracted position and an extended position, wherein the first friction disk in the extended position is in frictional contact with the first friction plate; and
      (ii) a second friction disk disposed around the stator shaft and adjacent to the second rotatable friction plate, wherein the second friction disk is axially moveable between a retracted position and an extended position, wherein the second friction disk in the extended position is in frictional contact with the second friction plate.

2. The dynamometer of claim 1, wherein the stator body further comprises:
   (a) a first actuation ring disposed within a first channel defined within the stator body, the first actuation ring operably coupled to the first friction disk; and
   (b) a second actuation ring disposed within a second channel defined within the stator body, the second actuation ring operably coupled to the second friction disk.

3. The dynamometer of claim 2, wherein the stator body further comprises a hydraulic pressure conduit defined within the stator body, wherein the hydraulic pressure conduit is in fluidic communication with the first channel and the second channel.

4. The dynamometer of claim 3, wherein the first and second actuation rings are hydraulically actuable by hydraulic fluid disposed within the hydraulic pressure conduit.

5. The dynamometer of claim 4, wherein increased pressure of the hydraulic fluid is configured to urge the first and second actuable rings outward, thereby urging the first and second friction disks into the extended positions.

6. The dynamometer of claim 1, further comprising:
   (a) a first support disk attached to the first actuation ring, wherein the first friction disk is attached to the first support disk; and
   (b) a second support disk attached to the second actuation ring, wherein the second friction disk is attached to the second support disk.

7. The dynamometer of claim 6, further comprising at least two tension springs, wherein each of the at least two tension springs is attached at a first end to the first support disk and at a second end to the second support disk, wherein each of the at least two tension springs is configured to urge the first and second friction disks toward the retracted positions.

8. The dynamometer of claim 1, wherein the first rotatable friction plate comprises first pockets defined in an outer surface of the first rotatable friction plate and the second rotatable friction plate comprises second pockets defined in an outer surface of the second rotatable friction plate, wherein the first and second pockets are configured to cause flow of cooling fluid within the cooling tank during rotation of the drum body.

9. A dynamometer comprising:
 (a) a cooling tank comprising cooling fluid;
 (b) a drum body rotatably disposed in the cooling tank, the drum body comprising:
  (i) a first rotatable friction plate rotatably disposed around a stator shaft, the first rotatable friction plate comprising a first inner friction surface comprising first transfer cavities defined within the first inner friction surface;
  (ii) a second rotatable friction plate rotatably disposed around the stator shaft, the second rotatable friction plate comprising a second inner friction surface comprising second transfer cavities defined within the second inner friction surface; and
  (iii) a connection tube attached to the first and second rotatable friction plates,
  wherein the first and second transfer cavities are configured to cause flow of lubrication fluid within the drum body during rotation of the drum body; and
 (c) a stator body disposed within the drum body and attached to the stator shaft, the stator body comprising:
  (i) a first friction disk disposed around the stator shaft and adjacent to the first rotatable friction plate, wherein the first friction disk is axially moveable between a retracted position and an extended position; and
  (ii) a second friction disk disposed around the stator shaft and adjacent to the second rotatable friction plate, wherein the second friction disk is axially moveable between a retracted position and an extended position.

10. The dynamometer of claim 9, wherein the first friction disk in the extended position is in frictional contact with the first rotatable friction plate and the second friction disk in the extended position is in frictional contact with the second rotatable friction plate.

11. A dynamometer comprising:
 (a) a cooling tank comprising cooling fluid;
 (b) a rotatable cylindrical drum body disposed in the cooling tank, the cylindrical drum body comprising:
  (i) first and second bases rotatably disposed around a stator shaft, the first base comprising a first inner friction surface and the second base comprising a second inner friction surface; and
  (ii) a circumferential body disposed between and attached to the first and second bases,
  wherein the first and second bases and the circumferential body define an interior of the cylindrical drum body;
 (c) a stator body disposed within the interior of the drum body, the stator body comprising:
  (i) a first axially actuable actuation ring disposed within a first channel defined within the stator body;
  (ii) a first friction disk operably coupled to the first axially actuable actuation ring and moveably disposed between the stator body and the first rotatable friction plate;
  (iii) a second axially actuable actuation ring disposed within a second channel defined within the stator body;
  (iv) a second friction disk operably coupled to the second axially actuable actuation ring and moveably disposed between the stator body and the second rotatable friction plate; and
  (v) a hydraulic pressure conduit defined within the stator body, wherein the hydraulic pressure conduit is in fluidic communication with the first and second channels.

12. The dynamometer of claim 11, wherein the first and second actuation rings are hydraulically actuable by hydraulic fluid disposed within the hydraulic pressure conduit, wherein increased pressure of the hydraulic fluid is configured to urge the first and second actuable rings outward, thereby urging the first and second friction disks into frictional contact with the first and second inner friction surfaces, respectively.

13. The dynamometer of claim 11, wherein the stator body further comprises:
 (a) at least two first ring pins attached to the stator body and disposed in the first channel; and
 (b) at least two second ring pins attached to the stator body and disposed in the second channel.

14. The dynamometer of claim 13, wherein
 the first actuation ring comprises at least two first ring pin openings defined within the first actuation ring, wherein the at least two first ring pins are slidably disposed within the at least two first ring pin openings such that the first actuation ring is axially movable in relation to the at least two first ring pins and rotationally constrained to the stator body, and
 the second actuation ring comprises at least two second ring pin openings defined within the second actuation ring, wherein the at least two second ring pins are slidably disposed within the at least two second ring pin openings such that the second actuation ring is axially movable in relation to the at least two second ring pins and rotationally constrained to the stator body.

15. The dynamometer of claim 11, wherein the first base comprises first transfer cavities defined in the first inner friction surface and the second base comprises second transfer cavities defined in the second inner friction surface, wherein the first and second transfer cavities are configured to cause flow of lubrication fluid within the interior during rotation of the drum body.

16. The dynamometer of claim 11, wherein the first base comprises first pockets defined in an outer surface of the first base and the second base comprises second pockets defined in an outer surface of the second base, wherein the first and second pockets are configured to cause flow of the cooling fluid within the cooling tank during rotation of the drum body.

17. A dynamometer comprising:
 (a) a cooling tank comprising:
  (i) a first reservoir;
  (ii) a second reservoir in fluidic communication with the first reservoir; and
  (iii) cooling fluid disposed within the first and second reservoirs;
 (b) a fixed stator shaft disposed within the first reservoir and comprising a longitudinal axis;

(c) a stator body fixedly attached to the fixed stator shaft, the stator body comprising:
   (i) a first friction disk moveably disposed on a first side of the stator body;
   (ii) a second friction disk moveably disposed on a second side of the stator body, wherein the first and second friction disks are actuable in opposing directions between a retracted position and an extended position along paths parallel to the longitudinal axis of the stator shaft; and
   (iii) a hydraulic pressure conduit defined within the stator body, wherein the hydraulic pressure conduit is operably coupled to the first and second friction disks such that increased hydraulic pressure in the hydraulic pressure conduit urges the first and second friction disks toward the extended positions; and
(d) a rotatable drum body rotatably disposed around the stator shaft and the stator body, the drum body comprising:
   (i) a first plate disposed adjacent to the first friction disk, the first plate comprising a first inner friction surface;
   (ii) a second plate disposed adjacent to the second friction disk, the second plate comprising a second inner friction surface; and
   (iii) a circumferential body coupled to the first plate and the second plate,
   wherein the first plate, second plate, and circumferential body define a fluidically sealed drum interior,
   wherein the first friction disk in the extended position is in frictional contact with the first inner friction surface and the second friction disk in the extended position is in frictional contact with the second inner friction surface.

18. The dynamometer of claim 17, wherein the first plate comprises first transfer cavities defined in the first inner friction surface and the second plate comprises second transfer cavities defined in the second inner friction surface, wherein the first and second transfer cavities are configured to cause flow of lubrication fluid within the drum interior during rotation of the drum body.

19. The dynamometer of claim 17, wherein the first plate comprises first pockets defined in an outer surface of the first plate and the second plate comprises second pockets defined in an outer surface of the second plate, wherein the first and second pockets are configured to cause flow of cooling fluid within the first and second reservoirs during rotation of the drum body.

20. The dynamometer of claim 17, wherein the stator body further comprises:
   (a) a first actuation ring disposed within a first channel defined within the stator body, the first actuation ring operably coupled to the first friction disk; and
   (b) a second actuation ring disposed within a second channel defined within the stator body, the second actuation ring operably coupled to the second friction disk,
   wherein the first and second channels are in fluidic communication with the hydraulic pressure conduit.

* * * * *